(No Model.)
J. A. SHIMP.
WEED TURNER.
No. 414,334. Patented Nov. 5, 1889.
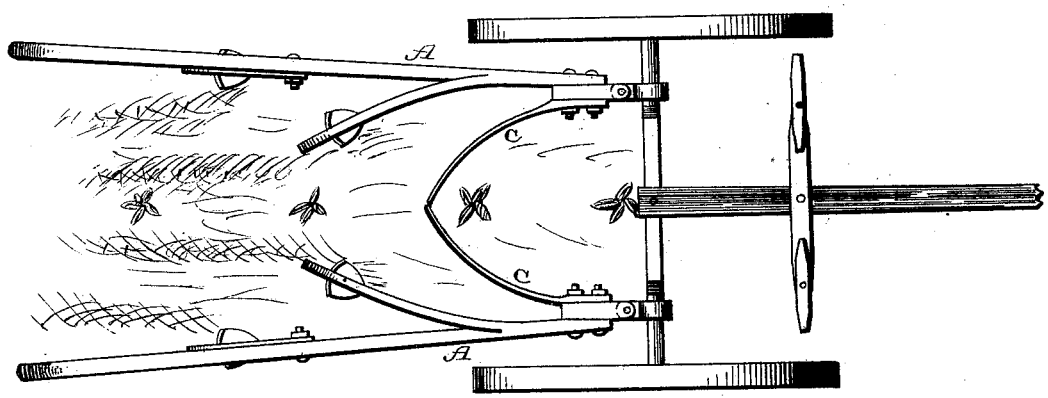

UNITED STATES PATENT OFFICE.

JACOB A. SHIMP, OF RIDGEVILLE, ILLINOIS.

WEED-TURNER.

SPECIFICATION forming part of Letters Patent No. 414,334, dated November 5, 1889.

Application filed July 19, 1889. Serial No. 318,034. (No model.)

*To all whom it may concern:*

Be it known that I, JACOB A. SHIMP, of Ridgeville, in the county of Iroquois and State of Illinois, have invented certain new and useful Improvements in Weed-Turners; and I do hereby declare the following to be a full, clear, and exact description of the invention, such as will enable others skilled in the art to which it pertains to make and use it, reference being had to the accompanying drawing, which forms part of this specification.

My invention relates to an improvement in weed-turners; and it consists in the combination of two springs which are attached to beams of the ordinary wheel-cultivators and which meet from opposite sides in between the hills of the growing corn for the purpose of turning down weeds, so as to hold them until the dirt displaced by the shovels can fall upon and bury them, as will be more fully described hereinafter.

The object of my invention is to produce devices for trailing down weeds in cultivated crops, and which are to be attached to the ordinary wheel-cultivator in place of the guards which are used for shielding the plants from dirt, and which devices hold the weeds in such a position between the hills that they can be buried.

The accompanying drawing represents a plan view of a weed-turner which embodies my invention.

A represents the beams of an ordinary wheel-cultivator, and attached to their inner sides just in advance of the cultivator-shovels are the two curved springs C, which have their lower ends to scrape along the ground, and which touch or almost touch each other. These springs are flexible enough to have their lower ends open outward when they come in contact with a hill or the stalks of growing corn, and then as soon as the hill or corn is passed they snap back again and catch the weeds which are growing in between the hills of corn, and hold them down, so that the earth displaced by the shovels will fall upon and cover them. These springs may be made from single pieces of steel, or from both iron and steel, for the purpose of reducing their cost, as may be preferred.

In cultivating large crops of corn it is necessary to plow the corn in such a manner as to destroy and cover with earth as many weeds as possible, and if the cultivation is delayed on account of rain or other causes the grass and weeds between the hills grow as fast as the corn, and, throwing the earth toward the hills to cover the weeds, there will be a little row of weeds left between the hills, and which will remain uncovered. By the use of the springs here shown and described the weeds and grass are drawn down between and around the hills and held in that position until the earth from the cultivator-shovels falls on and covers them, and that without dragging down the corn.

Having thus described my invention, I claim—

The combination, with the beams, of the springs applied to their inner sides and which have their lower ends to drag along the ground, substantially as shown and described.

In testimony whereof I affix my signature in presence of two witnesses.

JACOB A. SHIMP.

Witnesses:
J. L. BALDWIN,
AMOS M. PECK.